United States Patent [19]
Maiocchi

[11] 3,722,568
[45] Mar. 27, 1973

[54] LOWER SIDEWALL REINFORCEMENT FOR A RADIAL TIRE

[75] Inventor: Luigi Maiocchi, Milan, Italy

[73] Assignee: Industrie Pirelli S.P.A., Milan, Italy

[22] Filed: Oct. 26, 1971

[21] Appl. No.: 192,152

[30] Foreign Application Priority Data

Oct. 28, 1970 Italy .................. 89568 A/70

[52] U.S. Cl. ............................ 152/374, 152/362 CS
[51] Int. Cl. ................................................ B60c 15/06
[58] Field of Search ..... 152/354, 362 R, 362 CS, 374

[56] References Cited

UNITED STATES PATENTS

| | | | |
|---|---|---|---|
| 3,612,137 | 10/1971 | Guyot | 152/362 R |
| 3,612,138 | 10/1971 | Ravenhall | 152/362 R |
| 3,052,275 | 9/1962 | Hylbert, Jr. | 152/354 |

Primary Examiner—James B. Marbert
Assistant Examiner—Robert Saifer
Attorney—Stevens, Davis, Miller & Mosher

[57] ABSTRACT

An improved radial tire is disclosed which contains a rubber filling over the bead core wherein the rubber filling consists of two structural shapes being adjacent to one another. One shape is formed from a low hardness compound while the other is made from a high hardness compound with the latter shape being directed towards the axially outer zone of the bead. A sheet of a hard compound is placed in the axially outermost position of the bead adjacent to a strip of metal cord fabric which in turn is placed next to the high hardness structural shape. This structure prevents the metallic cord fabric from detaching itself from the tire which occurs when conventional radial tires are subjected to normal service conditions. It also prevents separation between the rubber filling and the carcass plies when the tires are subjected to severe service conditions.

9 Claims, 3 Drawing Figures

LOWER SIDEWALL REINFORCEMENT FOR A RADIAL TIRE

The present invention relates to pneumatic tires for vehicle wheels. In particular, it relates to pneumatic tires having a radial carcass; i.e., a carcass whose cords lie in meridian planes or form small angles with said planes.

It is known that the tires with a radial carcass have very flexible sidewall zones. Thus, under the action of load, they are very deformable in the vertical direction.

The repeated flexions originated by the rolling of the tire under service, combined with the stresses to which the sidewalls are subjected, give rise to premature deteriorations at the zones between the end of the rim flange and the lower portion of the sidewalls.

These deteriorations in large part consist of ruptures or detachments of the plies, or abrasions of the rubber against the rim flange. They are chiefly due to the passage from a rigid zone, such as the bead, to a flexible zone, such as the sidewall.

To eliminate these disadvantages, the zone subject to the above indicated drawbacks is generally reinforced; to this end, the beads are made in such a way as to comprise, in addition to the metal core and the carcass plies turned up about it, reinforcements of various kinds, as for instance, a filling of rigid rubber extending in the lower part of the sidewall. Strips of textile or metallic cord fabric arranged in the axially outer portion of the bead or strips of high rigidity rubber arranged in the outermost portion of the bead, which is intended to come into contact with the rim flange, have also been used.

In the present disclosure, the expression "axially outer portion of the bead" means the portion between the turn-up of the carcass plies and the outer surface of the bead itself, facing the rim flange.

When strips of metallic cord fabric are used, which are arranged in the axially outer portion of the bead, it is advisable to extend these strips to a height greater than that of the rim flange. This is done in order to protect the tire portion between the end of said rim flange and the sidewall where the above-indicated deteriorations take place.

In that case, when the tire is subjected to load action, the strips are subjected to a buckling causing them to flex in such a way that their concavity is directed towards the rim flange.

The effect of the buckling can be such as to cause detachments of the highest terminal parts of said strips of metallic cord fabric from the surrounding rubber. These detachments, once initiated, increasingly propagate along the direction of the stress and will give rise to the destruction of the bead.

When on the contrary a rubber filling of the above-mentioned type is used, generally arranged between the carcass plies and their relative turn-ups or also axially outside the latter, good results can be obtained in normal service conditions; however, drawbacks are encountered when the tire operates in particularly severe service conditions.

In fact, when the tire is subjected to load action and the lower portion of the sidewall is excessively deformed, detachments can be noticed between the carcass and the filling, caused by the different rigidity to flexion of the two parts.

The present invention aims at providing a radial carcass tire, whose beads, being devoid of the above-indicated disadvantages, offer a higher resistance to wear than radial carcass tires having conventional beads.

Accordingly, an object of the present invention is to provide a pneumatic tire for vehicle wheels comprising one or more carcass plies extending from one bead to the other, the cords of said plies lying in radial planes or forming small angles with said planes; said carcass plies being turned up about the bead cores towards the outer side; each bead comprising at least a rubber filling, disposed over the bead core; at least a strip of metal cord fabric extending from the zone of the bead core to a radially outer point with respect to the flange of the rim of an associated wheel; and at least a sheet of hard compound arranged in the axially outermost position of the bead, characterized in that:

a. the rubber filling comprises two structural shapes having in section an elongated form, said structural shapes being adjacent to each other and extending as far as a zone which is radially outer with respect to the strip of metal cord fabric;

b. the first structural shape is formed from a low hardness compound, and the second is formed from a high hardness compound;

c. the first structural shape is directed towards the carcass plies and the second is directed towards the axially outer zone of the bead;

d. the radially outer portion of the strip of metal cord fabric is inserted between said second structural shape and said sheet of hard compound;

e. said sheet of hard compound extends from the base of the bead to a zone which is radially outer with respect to said strip of metal cord fabric.

In the present disclosure, the expression "low hardness compound" means a compound whose hardness does not exceed 70 Shore degrees, while the expression "hard compound" means a compound having a hardness greater than 70 Shore degrees.

One of the advantages of the present invention resides in the fact that the radially outer part of the strip of metal cord fabric (i.e., the part extending radially beyond the rim flange) is completely surrounded by a hard compound which, just by virtue of this feature, can intimately cooperate with said strip to withstand the buckling to which the latter is subjected.

In fact, the higher the compound hardness, the higher its modulus of elasticity. Its value tends to reach that of the strip of metal cord fabric with a consequent reduction in the relative slidings occurring between the compound and the strip when the latter is subjected to the above-indicated buckling.

The reduction in said relative slidings results in the elimination of the detachments between the strip and the compound surrounding it.

A further advantage of the present invention is the fact that the filling comprises a structural shape of low hardness rubber which separates the carcass plies from the structural shape of hard rubber. Therefore, it is separated from the strip of metal cord fabric which considerably reduces the possibility of detachments inside the bead.

Taking into account the arrangement of the various elements constituting the bead according to the present invention, the neutral axis of the whole structure passes in a zone axially between the carcass plies and the strip of metal cord fabric.

It follows that when the tire is subjected to load action, the zone between said neutral axis and the inner surface of the tire directed towards the concavity of same is subjected to an increase of its state of tension while the zone between said neutral axis and the outer surface of the tire directed towards the convexity of same is subjected to a reduction in its state of tension which can even be annuled to such an extent as to be converted into a state of compression.

Since the various materials constituting the bead possess different moduli of elasticity, the result is that the two above-indicated zones are subjected to shear stresses which result in relative slidings; however, these are for the most part absorbed by the structural shape of the low hardness compound so that the possibility of detachments between the various elements constituting the bead is eliminated.

According to a preferred embodiment of the present invention, the filling comprising the two structural shapes, respectively constituted by a low hardness compound and by a hard compound, has a transversal section which becomes thinner as it approaches the sidewall. The part of said filling having the maximum section width is leant directly on the bead core and, preferably, is constituted by the second structural shape of hard compound.

The advantage of this embodiment is its simple construction and consequently its low cost; in fact, the filling is comprised between the carcass plies and the relative turn-ups, which is the normal position of conventional fillings.

According to a further embodiment, the filling is separated from the bead core by means of the turn-ups of the carcass plies which are wound up about said core and by means of a rubber layer of the type normally used in fillings and having a substantially triangular form. This rubber layer is placed directly on the bead core, and the terminal portions of the turn-ups are placed between the outermost carcass ply and the first structural shape of low hardness compound.

This embodiment is particularly advantageous for tires having a large number of carcass plies, or which are to be assembled on rims having a flange of reduced height.

In this case, it is known that the turn-ups are to be arranged in steps in order to offer a rigidity degree gradually decreasing from the bead towards the zone where the latter joins with the tire sidewall. Therefore, when it is deemed necessary to release the highest terminal portions of the turn-ups from compression stresses, it is preferred to extend these turn-ups over the bead core in order to rejoin them to the carcass plies and, consequently, to cause them to be subjected to the same tensile stresses to which said carcass plies are subjected.

According to a further preferred embodiment of the present invention, the first structural shape of low hardness compound extends from the radially outer zone with respect to the bead core to the sidewall zone for a portion whose half length corresponds approximately to the height of the radially outermost zone of the strip of metal cord fabric.

According to yet another embodiment of the invention, the second structural shape of hard compound extends radially as far as at least one-fourth of the section height of the tire.

This embodiment offers the advantage of obtaining a tire particularly resistant to the transversal stresses occurring during service.

According to another preferred embodiment of the hardness of the first structural shape ranges between 55 and 65 Shore degrees while the hardness of the second structural shape ranges between 85 and 95 Shore degrees.

The invention will be better understood with reference to the attached drawings, given by way of example, in which:

FIG. 1 shows in cross-section the bead of an 11 R-22.5 tubeless-type tire whose carcass 1 is constituted by a single ply of radial metal cords. This ply is turned up about the bead core 2 from the inside towards the outside.

Figure 1:
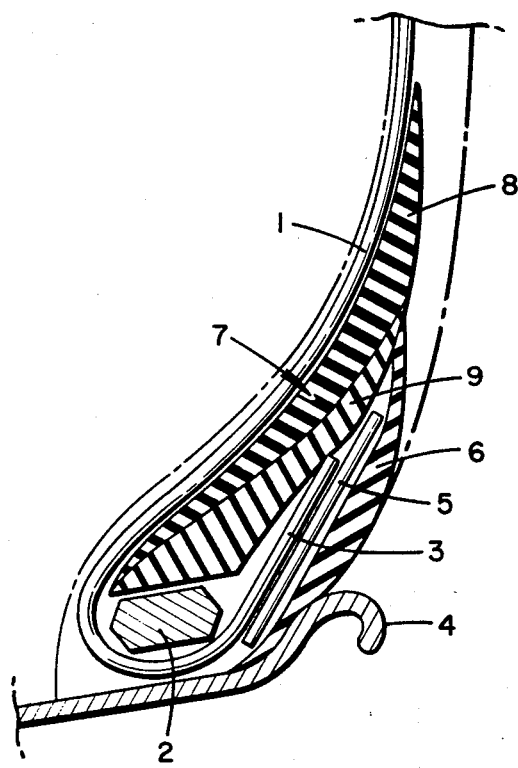
FIG. 1 represents in cross-section the bead of a tire having a radial carcass according to the invention.

The turn-up 3 of said carcass ply extends in the bead zone, in a position between the neutral axis and the flange of the associated rim 4.

A strip 5 of metal cord fabric is arranged in an axially outer position with respect to the turn-up 3; said strip extends from the zone of the bead core 2 as far as a height comprised between the end of the rim flange and the lower portion of the sidewall. More precisely, said strip 5 is higher than the rim flange by about 35 mm.

The cords of strip 5 are parallel to one another and are inclined at an angle of 30° with respect to the meridian plane of the tire.

A sheet 6 of a compound having a hardness of 90 Shore degrees is arranged at the axially outermost portion of the bead; said sheet extends from the bead base as far as a height about 15 mm greater than that of the strip 5 of metal cord fabric.

For the sake of clarity, the various elements of the bead have been illustrated as separated from one another; in practice, they are obviously in close contact.

A filling 7, constituted by two structural shapes of compound 8 and 9, is arranged on the bead core 2; the compound of structural shape 8 is of low hardness, more precisely of 60 Shore degrees, while the compound of structural shape 9 has a much higher hardness corresponding to 90 Shore degrees.

The structural shape 8 extends from the zone immediately over the bead core towards the tire sidewall for a length equal to 100 mm so that the central portion of said length is at a height equal to that of the upper terminal skirting of the strip 5 of metal cord fabric.

The structural shape 9, which constitutes the base of the filling 7 leaning on the bead core 2, extends towards the sidewall as far as to reach a height which exceeds by 20 mm the height of the terminal skirting of the strip 5 of metal cord fabric.

In this way, the radially outer part of said strip 5 is completely surrounded by a compound of high hardness and, therefore, is better able to withstand the buckling to which it is subjected.

Figure 2:
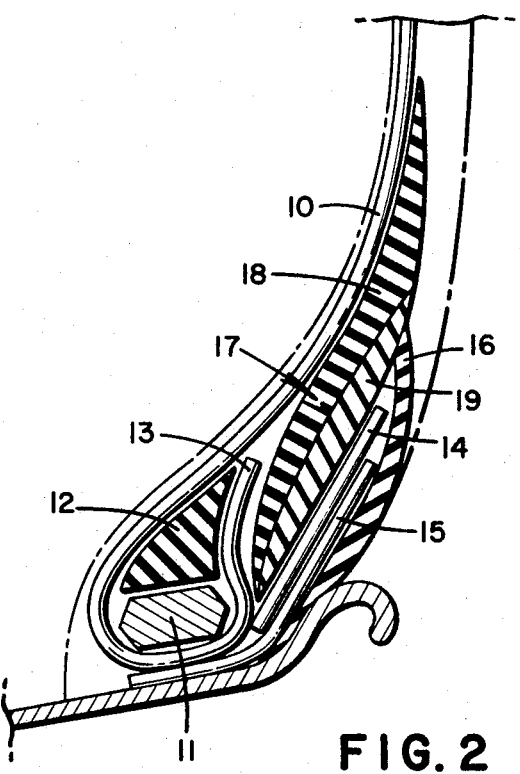
FIG. 2 represents a first embodiment of the invention.

As stated above, FIG. 2 represents a first alternative embodiment of the present invention; it shows a tire bead in cross-section having the same size as that illustrated in FIG. 1.

The bead comprises a bead core 11 on which is placed a layer of rubber 12 of the type commonly used in conventional fillings and having a substantially triangular form in cross-section.

The carcass 10 is constituted by four plies of radial rayon cords; for sake of simplicity, only one of said plies is illustrated in FIG. 2.

The carcass plies 10 are turned up about the bead core 11 from the inside towards the outside; the turn-ups 13 of said carcass plies extend in the bead zone, wrapping up completely also the rubber layer 12 and then, appropriately arranged in steps, rejoin the carcass 10.

Two strips 14 and 15 of metal cord fabric are situated in a radially outer position with respect to the turn-ups 13.

Strip 14 extends as indicated in the description of FIG. 1 while the lower part of the strip 15 also concerns the bead base.

The upper portion of said strip 15 is lower by about 10 mm with respect to strip 14 in order to provide an appropriate step.

A sheet 16 of a compound having a hardness of 90 Shore degrees is positioned at the axially outermost portion of the bead; said sheet extends from the bead base as far as a height exceeding by about 15 mm the height of strip 14.

A filling 17 constituted by two structural shapes 18 and 19 is interposed between the turn-ups 13 of the carcass plies and the strip 14 of metal cord fabric.

The compound forming the structural shape 18 has a hardness of 60 Shore degrees while the compound forming the structural shape 19 has a hardness of 90 Shore degrees.

The structural shape 18 extends for a length equal to 90 mm so that the median portion of said length is at a height equal to that of the upper terminal skirting of the strip 14 of metal cord fabric.

The structural shape 19 extends from the bead zone towards the sidewall exceeding by about 25 mm the height of the terminal skirting of strip 14.

Figure 3:
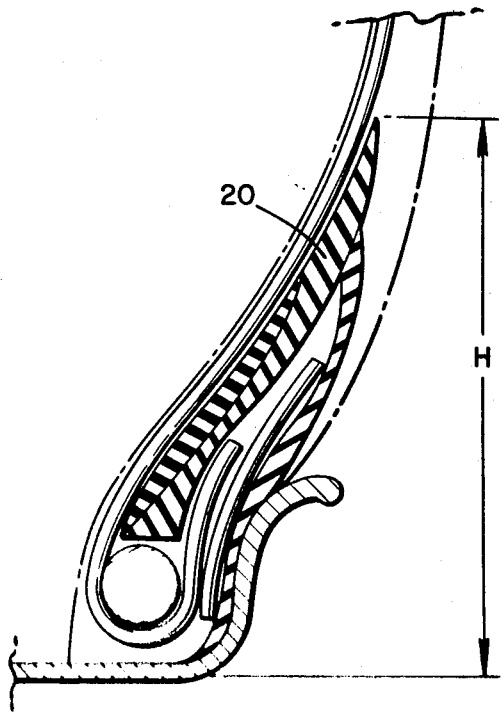
FIG. 3 represents a further embodiment of the invention.

FIG. 3 represents the bead of a 9.00 R–20 type tire whose structure is similar to that represented in FIG. 1; the only difference being that the structural shape 20 of hard rubber extends as far as a height greater than one-fourth of the section height of the tire, and more precisely as far as a height $H = 100$ mm since the section height is equal to 250 mm.

The details of construction of the invention may be varied as necessary, it being understood that the invention includes any other alternative embodiment deriving from the above-indicated inventive concept.

What is claimed is:

1. A pneumatic tire for vehicle wheels comprising
   at least one carcass ply extending from one bead to the other, the cords of said plies lying in radial planes or forming small angles with said planes, said carcass plies being turned up about the bead cores toward the outer side thereof,
   each bead comprising at least one rubber filling disposed over said bead core,
   at least one strip of metal cord fabric extending from the zone of the bead core to a radially outer point with respect to the flange of the rim of an associated wheel, and
   at least one sheet of a hard compound arranged in the axially outermost position of the bead, said tire characterized by:
   a. said rubber filling comprising two structural shapes having an elongated form in section, said structural shapes being adjacent to each other and extending as far as a zone which is radially outer with respect to said strip of metal cord fabric,
   b. said first structural shape formed from a low hardness compound and said second second structural shape formed from a high hardness compound,
   c. said first structural shape being directed towards said carcass plies and said second structural shape being directed towards the axially outer zone of said bead,
   d. said radially outer portion of said strip of metal cord fabric being inserted between said second structural shape and said sheet of hard compound, and
   e. said sheet of hard rubber compound extending from the base of the bead to a zone which is radially outer with respect to said strip of metal cord fabric.

2. The pneumatic tire of claim 1 wherein said rubber filling has a cross-section tapering towards the sidewall, the portion having the largest section being leant directly on the bead core.

3. The pneumatic tire of claim 1 wherein that portion of said rubber filling having the largest section is constituted by the second structural shape of said compound.

4. The pneumatic tire of claim 1 wherein said rubber filling is separated from the bead core by means of the turn-ups of the carcass plies which are wound up about said bead core and a rubber layer having a section of substantially triangular form, said rubber layer being placed directly on said bead core.

5. The pneumatic tire of claim 4 wherein the terminal skirtings of said turn-ups are placed between the outermost carcass ply and said first structural shape of low hardness compound.

6. The pneumatic tire of claim 1 wherein said first structural shape of low hardness compound extends from a zone which is radially outer with respect to the bead core towards the sidewall zone for a portion, the half length thereof being positioned at the height of the radially outermost zone of said strip of metal cord fabric.

7. The pneumatic tire of claim 1 wherein said second structural shape of hard compound extends radially as far as to at least one-fourth of the height of the tire section.

8. The pneumatic tire of claim 1 wherein said first structural shape has a hardness from about 55 to about 65 Shore degrees.

9. The pneumatic tire of claim 1 wherein said second structural shape has a hardness from about 85 to about 95 Shore degrees.

* * * * *